United States Patent
Ujike

(10) Patent No.: US 9,904,494 B2
(45) Date of Patent: Feb. 27, 2018

(54) IMAGE FORMING APPARATUS FOR DETERMINING A COMMON BLANK SPACE FOR PARALLEL CONTINUOUS PRINTING

(71) Applicant: Konica Minolta, Inc., Chiyoda-ku, Tokyo (JP)

(72) Inventor: Hiroyuki Ujike, Kokubunji (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 15/002,787

(22) Filed: Jan. 21, 2016

(65) Prior Publication Data

US 2016/0231966 A1 Aug. 11, 2016

(30) Foreign Application Priority Data

Feb. 6, 2015 (JP) .................................. 2015-022493

(51) Int. Cl.
  *G06F 3/12* (2006.01)
  *G06K 15/02* (2006.01)

(52) U.S. Cl.
  CPC .......... *G06F 3/1219* (2013.01); *G06F 3/1251* (2013.01); *G06F 3/1282* (2013.01); *G06K 15/022* (2013.01); *G06K 15/186* (2013.01); *G06K 2215/0088* (2013.01)

(58) Field of Classification Search
  CPC .... G06F 3/1219; G06F 3/1282; G06F 3/1251; G06K 15/186; G06K 15/022
  See application file for complete search history.

(56) References Cited

U.S. PATENT DOCUMENTS

| | | | |
|---|---|---|---|
| 2004/0109201 A1* | 6/2004 | Teraue | H04N 1/3872 358/1.18 |
| 2008/0123138 A1* | 5/2008 | Banerjee | H04N 1/00132 358/1.18 |
| 2008/0291492 A1* | 11/2008 | Miyagi | G06F 3/1208 358/1.15 |
| 2011/0069329 A1* | 3/2011 | Abe | G06F 3/1219 358/1.9 |

(Continued)

FOREIGN PATENT DOCUMENTS

| | | |
|---|---|---|
| JP | 10-213944 A | 8/1998 |
| JP | 2005-47137 A | 2/2005 |

(Continued)

OTHER PUBLICATIONS

Japanese Notification of Reasons for refusal issued by the Japanese Patent Office dated Mar. 21, 2017 in corresponding Japanese Patent Application No. 2015-022493 (with English translation only).

*Primary Examiner* — Benjamin O Dulaney
(74) *Attorney, Agent, or Firm* — Buchanan Ingersoll & Rooney PC

(57) ABSTRACT

Provided is an image forming apparatus which acquires a plurality of jobs for repeatedly arranging images having widths smaller than a width of a continuous paper in a conveyance direction of the continuous paper, sets information for arranging the acquired jobs in a width direction of the continuous paper, forms images based on the set information, and sets a common blank forming period at which blanks among images appearing at different periods in each job coincide with each other between the jobs in the conveyance direction and forms a common blank.

20 Claims, 13 Drawing Sheets

(56) References Cited

U.S. PATENT DOCUMENTS

| | | | |
|---|---|---|---|
| 2012/0081726 A1* | 4/2012 | Nakamaru | G06K 15/022 358/1.12 |
| 2012/0236336 A1* | 9/2012 | Morita | G06F 3/1204 358/1.9 |
| 2013/0128315 A1* | 5/2013 | Arora | G06F 3/1208 358/1.18 |
| 2013/0286410 A1* | 10/2013 | Yasinover | H04N 1/387 358/1.2 |
| 2015/0347060 A1* | 12/2015 | Honda | G06F 3/121 358/1.14 |

FOREIGN PATENT DOCUMENTS

| | | |
|---|---|---|
| JP | 200980790 A | 4/2009 |
| JP | 2011-88373 A | 5/2011 |

* cited by examiner

US 9,904,494 B2

IMAGE FORMING APPARATUS FOR DETERMINING A COMMON BLANK SPACE FOR PARALLEL CONTINUOUS PRINTING

CROSS-REFERENCE TO RELATED APPLICATION

This application is based on Japanese Patent Application No. 2015-022493 filed on Feb. 6, 2015, the contents of which are incorporated herein by reference.

BACKGROUND

1. Technical Field

The present invention relates to an image forming apparatus, an image forming method, a non-transitory computer-readable recording medium stored with a common blank forming period setting program, and an image forming system.

2. Description of Related Art

There has been proposed an image forming apparatus that performs printing by using a continuous paper such as a rolled paper. The rolled paper, for example, is a paper having a width of about several hundreds of millimeters and a conveyance direction length of about several hundreds of meters. Since the rolled paper has a wide paper surface, a plurality of images can be continuously printed. However, if printing is not performed in the state in which images have been efficiently arranged on the paper surface, it results in a problem that a blank area becomes wide and thus the paper is wasted.

In order to reduce the blank area in such a problem, there has also been known a technology in which images of a job are arranged in a width direction of a rolled paper and is printed (for example, Japanese Patent Application Laid-Open No. 2005-47137). In the technology disclosed in the patent document, at the time point at which the arranged images have protruded in the width direction of the rolled paper, the cutting position of the rolled paper is determined according to an image having the longest length in a conveyance direction among the already arranged images. Other images are arranged in blank areas among the arranged images and the cutting position, so that a paper is effectively utilized.

Moreover, in recent years, in printing of a label and the like, images of a job are repeatedly arranged in a conveyance direction of a rolled paper and image sequences are printed. Also in this case, in order to effectively utilize a paper, there has been proposed a technology in which a plurality of image sequences arranged in a conveyance direction of the paper are arranged in a width direction of the paper so as to be printed.

However, as described above, when a plurality of image sequences arranged in the conveyance direction of the paper are arranged in the width direction of the paper and are printed, the lengths of images included in each image sequence and the lengths of blanks among the images are various. Therefore, when it is necessary to cut the paper in the width direction during printing due to the occurrence of jam and the like, it is difficult to find a position at which the paper can be cut without cutting images of any image sequences. When the images are cut, an operator confirms the number and content of the cut images and needs to perform setting of re-printing, discard of the cut images and the like, resulting in an increase in work load.

SUMMARY

The present invention is achieved in view of the problems described above. Therefore, an object of the present invention is to provide an image forming apparatus, an image forming method, a non-transitory computer-readable recording medium stored with a common blank forming period setting program, and an image forming system, capable of efficiently cutting a paper without cutting images when a plurality of jobs for printing images repeatedly arranged in a conveyance direction of the paper are arranged in a width direction and are printed.

To achieve at least one of the abovementioned objects, an image forming apparatus reflecting one aspect of the present invention includes: an acquisition unit which acquires a plurality of jobs for repeatedly arranging images having widths smaller than a width of a continuous paper in a conveyance direction of the continuous paper; a control unit which sets information for arranging the jobs acquired by the acquisition unit in a width direction of the continuous paper; and an image forming unit which forms images based on the information set by the control unit, wherein the control unit sets a common blank forming period at which blanks among images appearing at different periods in each job coincide with each other between the jobs in the conveyance direction and forms a common blank.

Preferably, the aforementioned image forming apparatus further has a maximum permissible value reception unit which receives setting of a maximum permissible value of the common blank forming period, and the control unit changes a length of a blank between images of at least one of the plurality of jobs and sets the common blank forming period such that the common blank forming period does not exceed the maximum permissible value.

In the aforementioned image forming apparatus, preferably, the control unit selects jobs, which are arranged in the width direction and are combined for image formation, regardless of an acquisition order of the jobs such that the common blank forming period is within a desired range.

Preferably, the aforementioned image forming apparatus further has an identification mark forming unit which forms an identification mark in vicinity of the common blank.

Preferably, the aforementioned image forming apparatus further has an identification mark information reception unit which receives input of identification mark information representing the identification mark, and the control unit designates a position, at which image formation is restarted after jam occurs in the continuous paper, based on the identification mark information received in the identification mark information reception unit.

In the aforementioned image forming apparatus, preferably, the control unit calculates a number of remaining images which include images broken by the jam in each job and is not completely subjected to image formation based on the identification mark information, and regenerates a job for forming the remaining images.

The objects, features, and characteristics of this invention other than those set forth above will become apparent from the description given herein below with reference to preferred embodiments illustrated in the accompanying drawings.

DETAILED DESCRIPTION

Figure 1:
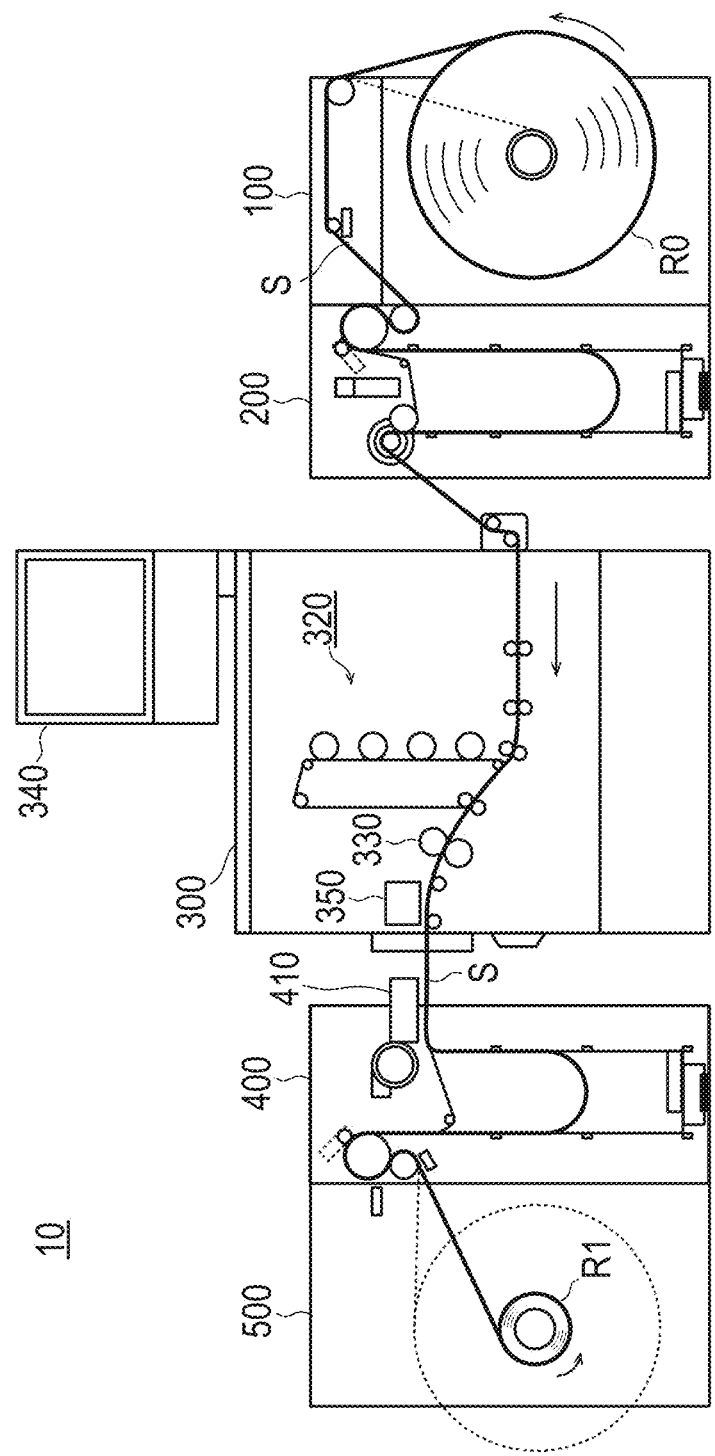
FIG. 1 is a diagram illustrating a schematic configuration of an image forming system according to an embodiment of the present invention.

Hereinafter, embodiments of the present invention will be described with reference to the accompanying drawings. In the description of the drawings, the same elements are denoted by the same reference numerals, and redundant description is omitted. In addition, in some cases, dimensional ratios in the drawings are exaggerated and different from actual ratios for convenience of the description.

FIG. 1 is a diagram illustrating a schematic configuration of an image forming system according to an embodiment of the present invention.

As illustrated in FIG. 1, an image forming system 10 includes a paper feeding apparatus 100, a paper feeding adjustment apparatus 200, an image forming apparatus 300, a paper discharge adjustment apparatus 400, and a winding apparatus 500.

The paper feeding apparatus 100 receives and holds a roll R0 which is an original roll of a continuous paper, and sends a continuous paper S to a downstream side of a paper conveyance direction.

The paper feeding adjustment apparatus 200 has a buffer function of absorbing a minute difference of paper conveyance speeds between the paper feeding apparatus 100 and the image forming apparatus 300 and a paper deviation.

The image forming apparatus 300 includes an image forming unit 320 for performing image formation by a well-known electro-photographic process using toner, a fixing unit 330, and a reading unit 350. The image forming unit 320 includes a photosensitive drum, a developing device, a writing unit 321 (see FIG. 2), an intermediate transfer belt and the like. In the image forming unit 320, a toner image is transferred to a paper surface of the continuous paper S sent from the paper feeding apparatus 100 and is subjected to a heating and pressing process in the fixing unit 330, so that the toner image is fixed to the surface of the continuous paper S.

The reading unit 350 uniformly irradiates light to a paper by a light source (a lamp) and allows an image of reflected light of the light to be formed on a line-shaped optical sensor via a light receiving lens, so that it is possible to obtain image data with high resolution (for example, 400 dpi). The optical sensor, for example, is configured with three types of RGB sensors, and outputs a detection signal based on output values (RGB values) from the three types of sensors for each part of a color image. Furthermore, the optical sensor has a sufficient length in a width direction of the conveyed continuous paper S, and can sense an entire area of the continuous paper S.

The image forming apparatus 300 is provided at an upper portion thereof with an operating display unit 340. The operating display unit 340 receives user operations and displays various types of information. To this end, the operating display unit 340, for example, may have any configurations such as a configuration in which an operating part and a display part are integrally formed with each other similarly to a touch panel, and a configuration such as a hard key of a button, a key and the like and a liquid crystal display device. Furthermore, the operating display unit 340 may be installed in a casing of the image forming apparatus 300 as illustrated in FIG. 1, and may also be separated from the casing of the image forming apparatus 300.

The paper discharge adjustment apparatus 400 also has a buffer function of absorbing a minute difference of paper conveyance speeds between the image forming apparatus 300 and the winding apparatus 500 and a paper deviation, similarly to the paper feeding adjustment apparatus 200. Furthermore, the paper discharge adjustment apparatus 400 has a cutter 410 for cutting the continuous paper S, and can cut the continuous paper S at a desired position along a width direction perpendicular to a conveyance direction.

The continuous paper S having passed through the paper discharge adjustment apparatus 400 reaches the winding apparatus 500, and is wound around a roll R1 and is held.

In addition, in the present embodiment, a rolled paper is used as the continuous paper S; however, the continuous paper S is not limited to the rolled paper and may use any papers if they are continuous. The continuous paper S, for example, may use an alternately folded paper. Furthermore, the material of the continuous paper S is not limited to a paper, and a medium such as a cloth may also be used. Furthermore, the continuous paper S may be a label paper obtained by bonding a label, which has been obtained by coating an adhesive to a paper, to a release paper. In the case of using the label paper, the label may also be configured to be cut out with a size corresponding to an image by the cutter 410.

Figure 2:
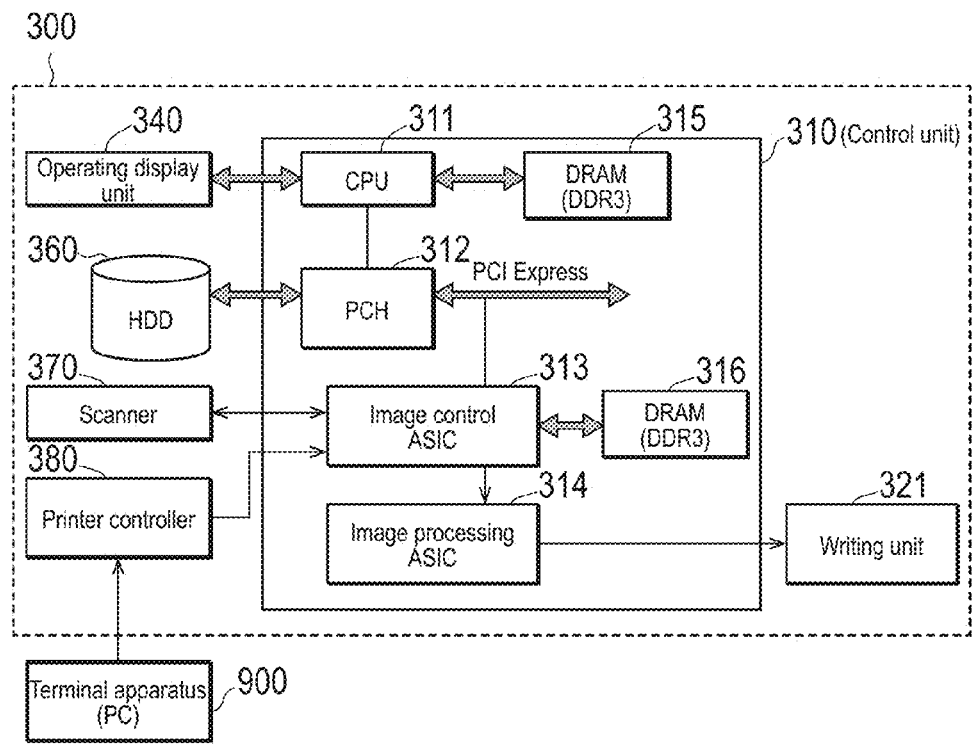
FIG. 2 is a block diagram illustrating a hardware configuration of an image forming apparatus.

FIG. 2 is a block diagram illustrating a hardware configuration of the image forming apparatus.

As illustrated in FIG. 2, the image forming apparatus 300 includes a control unit 310, an operating display unit 340, an HDD 360 which is a storage device with large capacity, a scanner 370 for reading a document image, and a printer controller 380.

The control unit 310 includes a CPU 311, a platform control hub (PCH) 312, an image control ASIC 313, an image processing ASIC 314, and DRAMs 315, 316.

The CPU 311 executes various programs stored in the DRAM 315 or the HDD 360, thereby generally controlling the image forming apparatus 300 and an operation of the entire image forming system 10.

Image data for printing sent from a terminal apparatus 900 configured by a PC and the like is stored in the DRAM 316 serving as an image memory via the printer controller 380. Furthermore, document image data read by the scanner 370 is also stored in the DRAM 316. At the time of printing, image data to be printed is read from the DRAM 316 and an image signal is sent to the writing unit 321 of the image forming unit 320.

Figure 3:
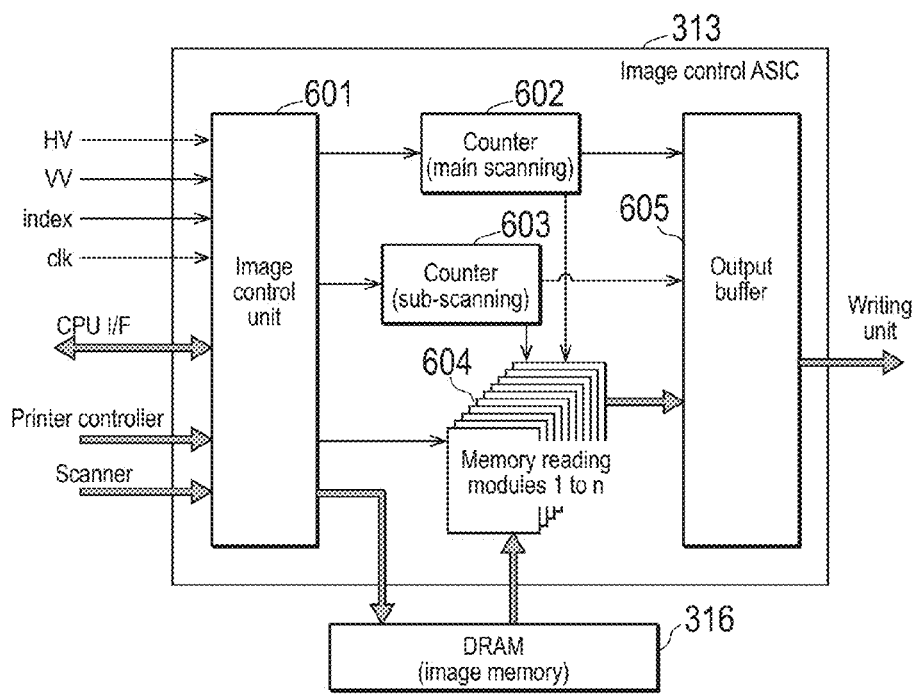
FIG. 3 is a block diagram illustrating functions of an image control ASIC.

FIG. 3 is a block diagram illustrating the functions of the image control ASIC.

As illustrated in FIG. 3, the image control ASIC 313 includes an image control unit 601, counters 602 and 603, a plurality of memory reading modules 604, and an output buffer 605.

The image control unit 601 receives various timing signals such as vertical and horizontal synchronization signals HV and VV, an index signal index, and a pixel clock signal clk. The image control unit 601 reads the image data stored in the DRAM 316, stores the image data in the memory reading modules 604, and sends the image data to the output buffer 605 in response to a timing signal by which these pieces of image data has been received. The output buffer sends a pixel signal to the writing unit 321 for each one line in response to timing signals from the counters 602 and 603.

In the present embodiment, in order to continuously output a plurality of pieces of image data by using such a configuration along the conveyance direction of the continuous paper, the memory reading modules 604 are provided as a hardware configuration.

In addition, each configuration of the image forming system 10 may also include elements other than the aforementioned elements, or may also not include a part of the aforementioned elements.

Figure 4:
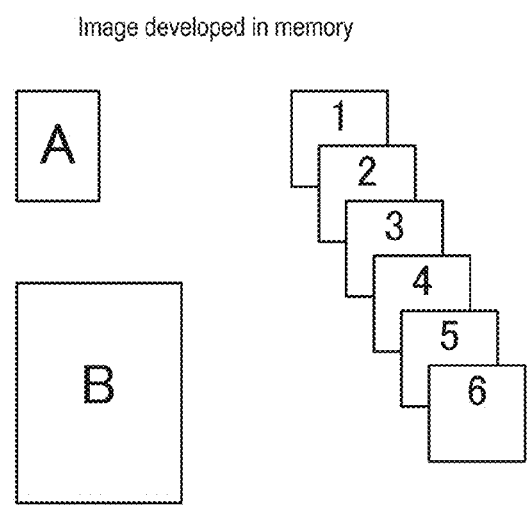
FIG. 4 is a schematic diagram illustrating images developed on a DRAM serving as an image memory as bitmap format data.

FIG. 4 is a schematic diagram illustrating images developed on the DRAM serving as the image memory as bitmap format data.

As illustrated in FIG. 4, in the DRAM 316, an image A, an image B, and variable images (indicated by numerals 1 to 6 and the like) are developed and stored. The variable images are images obtained by combining a fixed frame image with variable images arranged in its internal area with each other.

Figure 5:
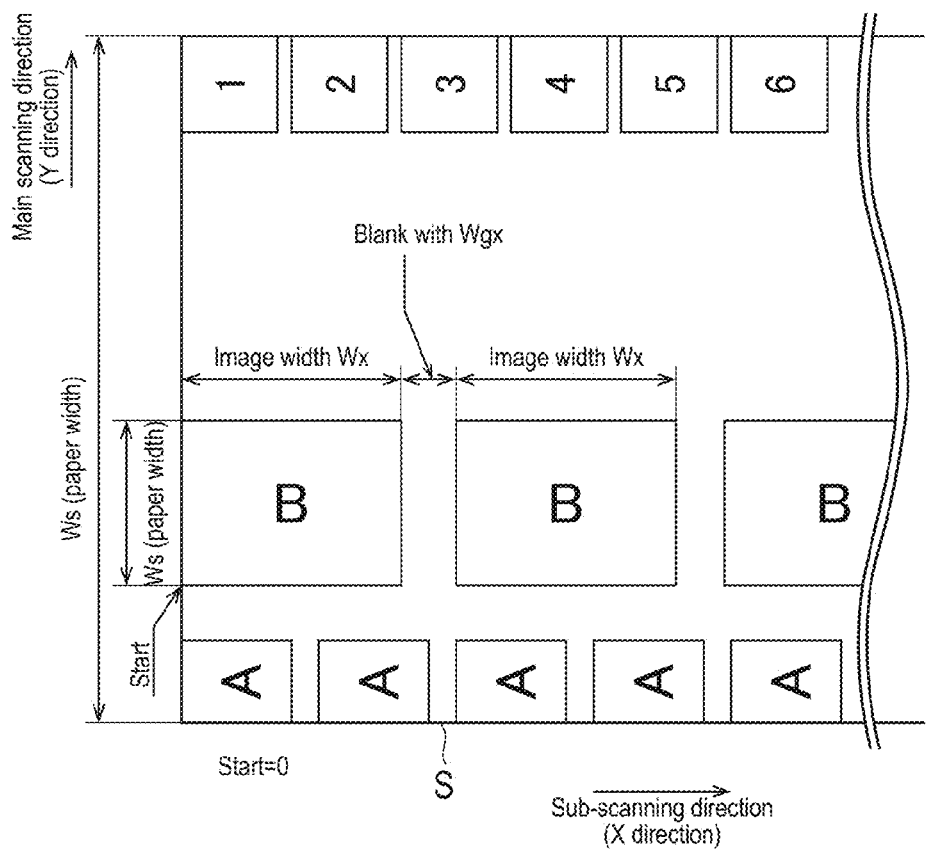
FIG. 5 is a diagram illustrating a print example of a continuous paper in the present embodiment.

FIG. 5 is a diagram illustrating a print example of a continuous paper in the present embodiment.

As illustrated in FIG. 5, on the continuous paper S, a plurality of images A, a plurality of images B, and variable images 1 to 6 have been printed. The plurality of images A have been arranged along a sub-scanning direction which is a paper conveyance direction. Similarly, the plurality of images B and the variable images 1 to 6 have also been arranged along the sub-scanning direction, respectively. An image sequence of the plurality of images A, an image sequence of the plurality of images B, and an image sequence of the variable images 1 to 6 have been sequentially arranged along a main scanning direction which is a paper width direction.

The memory reading module 604 has a repeat function and a memory reading function. The repeat function is a function of reading normal images (the images A and B) developed in the DRAM 316 to a memory module, arranging the images at arbitrary positions in the main scanning direction, and repeatedly outputting the images in the sub-scanning direction. The memory reading function is a function of sequentially reading variable image data (1 to 6) from the DRAM 316, sequentially arranging the data at arbitrary positions in the main scanning direction, and outputting the data.

These two functions can be handled with one circuit configuration. In detail, the two functions are performed by a count value and an instruction from the image control unit 601. The image control unit 601 sets a start position (see FIG. 5) and a width regarding the main scanning direction, a start position regarding the sub-scanning direction, an image interval (a blank), and the number of repetitions for each memory reading module 604. In addition to this, the image control unit 601 can set image reading addresses and sizes and transmits an instruction to the respective memory reading modules 604 in response to setting values. In addition, a maximum value of output of a counter regarding the sub-scanning direction corresponds to a feeding length (4 km to 6 km) of the roll R0 having a maximum diameter available in the image forming system 10.

The image control ASIC 313 includes n memory reading modules 604. The n corresponds to the upper limit number of images which can be arranged in the main scanning direction. In the present embodiment, on the assumption that a width of the continuous paper S which can be conveyed is 300 mm to 400 mm and images having a width of 20 mm are provided, when images have been laid and arranged in the width direction of the continuous paper S, the upper limit number of images arrangeable is about 15 to 20. Accordingly, the n may also be set to 15 to 20.

Each memory reading module 604 sequentially reads images from the DRAM 316 in response to main and sub-counter values from the counters 602 and 603 according to the instruction from the image control unit 601, and stores the images in the output buffer. The output buffer arranges image data from each memory reading module 604 in one line. Then, the data of one line is aligned and collected, and is output to the writing unit 321 via the image processing ASIC 314.

As illustrated in FIG. 5, when normal images, other than variable images, are arranged on the continuous paper S, the sub-scanning start of an initial image is set to 0 and the sub-scanning start of a next image is set to (the sub-scanning start of a previous image)+an image width Wx+an image interval Wgx). This is repeated by the preset number of repetitions (the number of settings). When the variable images are arranged on the continuous paper, in the first page (the first image), the sub-scanning start is set to 0 and the number of repetitions is set to 1, and in the second page (the second image) and subsequent pages, the sub-scanning start is set to (the sub-scanning start of a previous page)+the image width Wx+the image interval Wgx).

Figure 6:
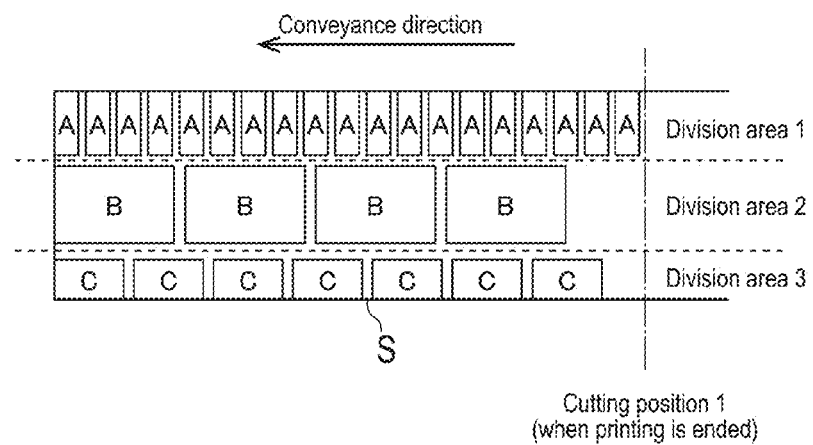
FIG. 6 is a diagram illustrating a continuous paper subjected to a printing process in an image forming system.
Figure 7:
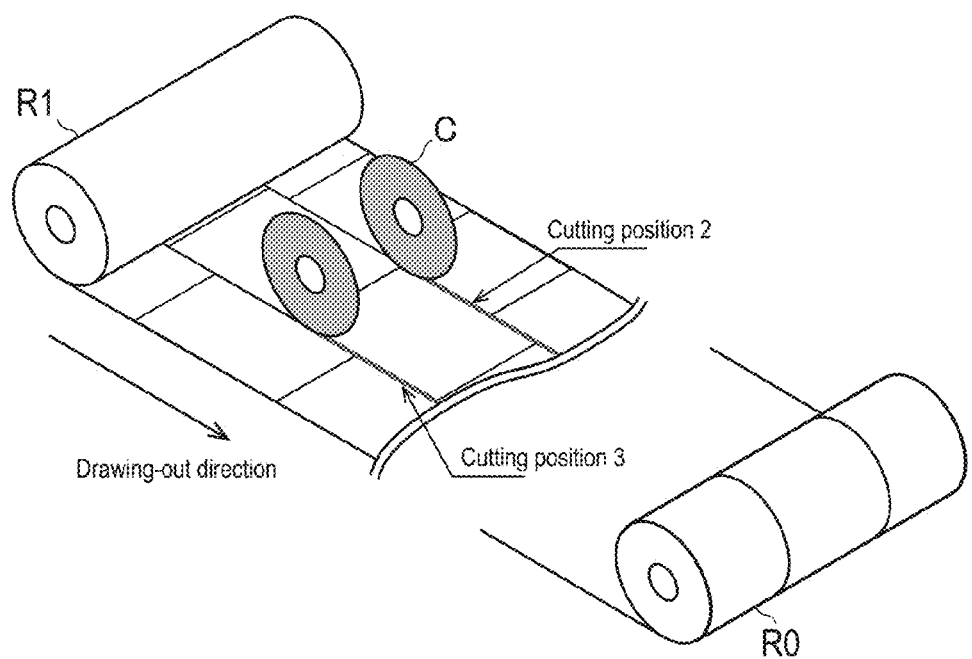
FIG. 7 is a diagram for explaining a cutting process of a continuous paper.

Next, referring to FIG. 6 and FIG. 7, a printed matter produced in the present embodiment will be described. FIG. 6 is a diagram illustrating a continuous paper subjected to a printing process in the image forming system. FIG. 7 is a diagram for explaining a cutting process of the continuous paper.

As illustrated in FIG. 6, an image forming area of the continuous paper S is divided into a plurality of strip-shaped division areas 1 to 3 extending along the conveyance direction of the continuous paper S. In the example illustrated in FIG. 6, an image A of a job JA is arranged in the division area 1, an image B of a job JB is arranged in the division area 2, and an image C of a job JC is arranged in the division area 3. In addition, in the example illustrated in FIG. 6, the length of the image forming area in the width direction is set to be equal to the length of the continuous paper S in the width direction, but in order to respectively provide blanks of about 1 mm to 2 mm at both end portions, the width of the image forming area may also be set to be narrower than that of the continuous paper S.

In order to obtain printed matters in which respective images have been separated from the continuous paper S on which the images as illustrated in FIG. 6 have been printed, the following cutting process is performed. Firstly, the continuous paper S is cut at the rear end position of the image of the job JA, which is a job having the longest image length in the conveyance direction of the continuous paper S, that is, a cutting position 1 at which the rear end of the division area 1 extends in a direction Y (the main scanning direction). This cutting may also be performed by the cutter 410. In this case, when the cutting position 1 of the continuous paper S has reached the cutter 410, the conveyance of the continuous paper S is stopped once and the continuous paper S in the stopped state is cut. Alternatively, the continuous paper S may also be handled off-line by another cutting device without using the cutter 410.

Next, as illustrated in FIG. 7, the continuous paper S is cut along cutting positions 2 and 3 extending in a direction X (the sub-scanning direction). For example, while the continuous paper S is being drawn out from the roll R1 in a direction opposite to the winding direction of FIG. 1, the continuous paper S is cut by cutters C, which have been arranged at positions corresponding to the cutting positions 2 and 3, along the cutting positions 2 and 3. The cut continuous paper S may also be wound again in a roll shape similarly to the roll R0. Alternatively, by the cutters C, the continuous paper S having the shape of the roll R1 is cut into round slices in a direction vertical to a shaft, so that the continuous paper S may also be cut along the cutting positions 2 and 3.

When the continuous paper S is a label paper, the aforementioned process is performed, so that the procedure for producing a printed matter is ended. The obtained roll-shaped printed matter is loaded in a labeler (an automatic labeling machine) and is used in a next procedure.

When the material of the continuous paper S is a normal paper, the continuous paper S is cut along the cutting positions 2 and 3 extending in the direction X as described above, and then is cut along the cutting position extending in the direction Y in order to separate respective images from the continuous paper S. This is performed for images of all jobs. In this way, it is possible to obtain printed matters cut for each image.

As illustrated in FIG. 6, the lengths of the images in the conveyance direction and intervals among the images in each job are various. Therefore, periods, in which blanks among images appear, differ in each job. In the present embodiment, a blank adjustment process to be described later is performed, so that it is possible to set a period at which positions in the conveyance direction, at which blanks among images appear in each job, coincide with one another between jobs and a common blank is formed. The common blank, that is, is an area where blanks are continuously formed from one end to the other end of the continuous paper S throughout the width direction of the continuous paper S.

<Overview of Processes in Image Forming System 10>

Figure 8:
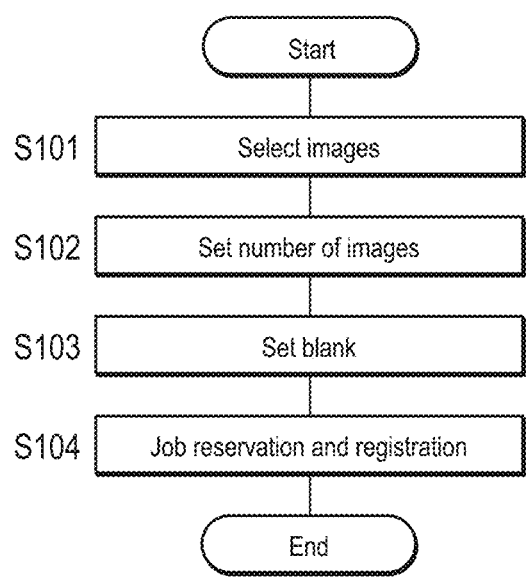
FIG. 8 is a flowchart illustrating the procedure of a job registration process performed in an image forming system.
Figure 9:
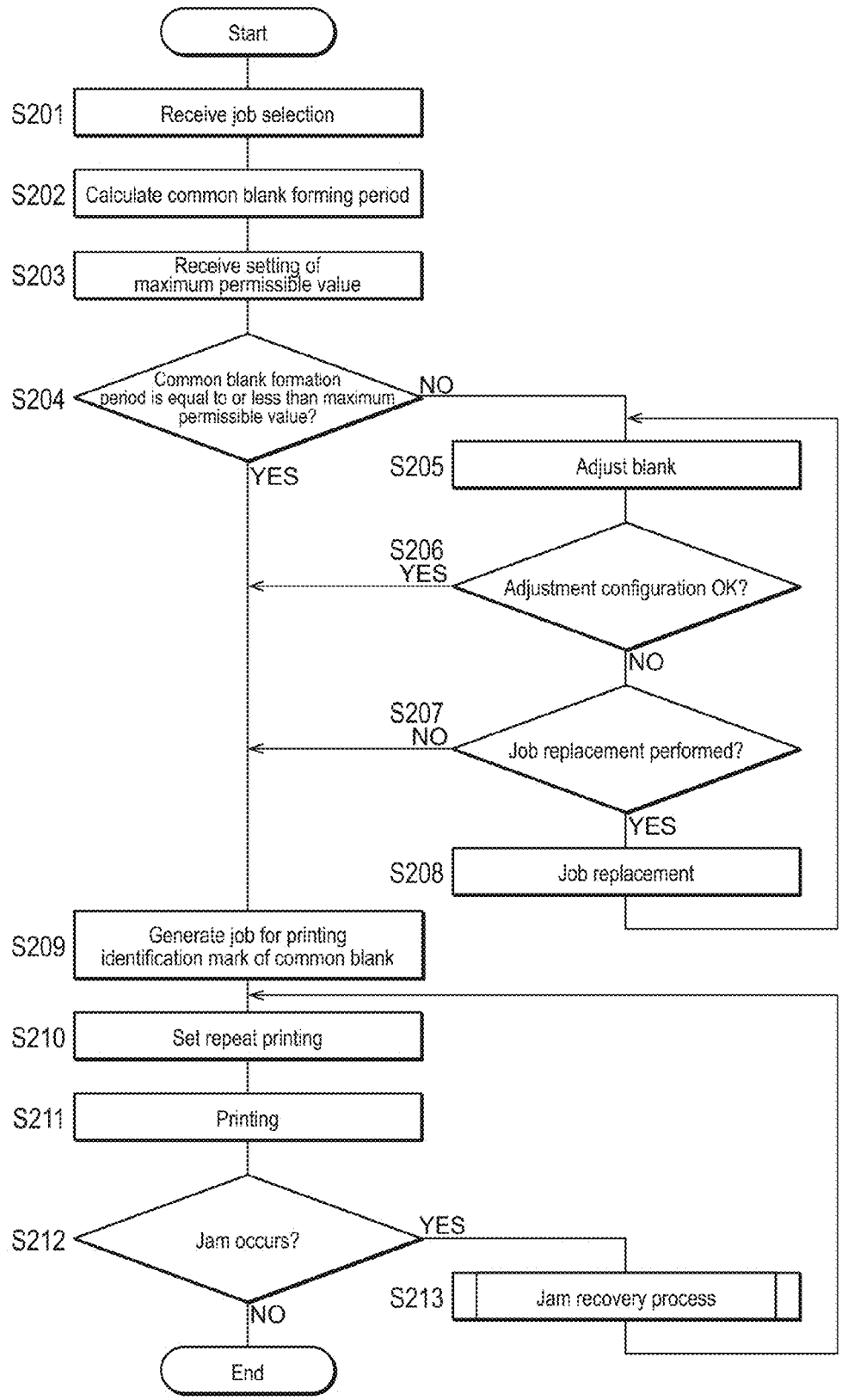
FIG. 9 is a flowchart illustrating the procedure of a printing process performed in an image forming system.

FIG. 8 is a flowchart illustrating the procedure of a job registration process performed in the image forming system. FIG. 9 is a flowchart illustrating the procedure of a printing process performed in the image forming system. Algorithms illustrated in FIGS. 8 and 9, for example, have been stored in the HDD 360 of the image forming apparatus 300 as programs, and are executed by the control unit 310.

Firstly, the job registration process in the image forming system 10 will be described.

As illustrated in FIG. 8, the control unit 310 receives the selection of images to be printed from a user (step S101). In detail, when images displayed on the operating display unit 340 of the image forming apparatus 300 have been selected by a touch operation, a key operation of the user and the like, the control unit 310 receives the selection of the images. Alternatively, when the control unit 310 allows images to be displayed on a display unit of the terminal apparatus 900 and the images displayed on the display unit have been selected by a touch operation of a user and the like, the control unit 310 may also receive the selection of the images.

Subsequently, the control unit 310 receives the setting of the number of images to be printed (step S102). The received number of images is the number of images repeatedly arranged in the conveyance direction of the continuous paper S. A method for receiving the setting of the number of images is similar to the process of step S101.

Subsequently, the control unit 310 receives the setting of the length of a blank formed between the images (step S103). The received length of the blank is a length in the conveyance direction of the blank formed between the images repeatedly arranged in the conveyance direction of the continuous paper S. A method for receiving the setting of the length of the blank is similar to the process of step S101.

Subsequently, the control unit 310 performs reservation registration of a job (step S104). In detail, based on each information set in steps S101 to S103, the control unit 310 generates a job for repeatedly arranging images in the conveyance direction of the continuous paper S, and registers the job in a job list in which jobs waited to be performed are listed. The control unit 310 repeats the aforementioned process, thereby registering a plurality of jobs in the job list.

Next, the printing process in the image forming system 10 will be described.

As illustrated in FIG. 9, the control unit 310 receives the selection of jobs and acquiring a plurality of selected jobs by serving as an acquisition unit (step S201). In detail, the control unit 310 receives the selection of the plurality of jobs from the job list via an operation of a user and the like in the operating display unit 340. The control unit 310 employs the plurality of selected jobs as one job set, arranges them in the width direction of the continuous paper S as illustrated in FIG. 5, and simultaneously printing them. Among the plurality of selected jobs, jobs, which are not collected in the width direction and are not able to be simultaneously printed as one job set, are included in a subsequent job set and are sequentially printed.

Subsequently, for the plurality of jobs included in one job set to be printed, the control unit 310 calculates a common blank formation period which is a period at which a common blank is formed (step S202). Details of the calculation process of the common blank formation period will be described later.

Subsequently, the control unit 310 serves as a maximum permissible value reception unit and receives the setting of a maximum permissible value which is a maximum value of the common blank formation period which can be permitted by a user (step S203). In detail, the control unit 310 receives the setting of the maximum permissible value via the operation of the user and the like in the operating display unit 340. The user, for example, considers the lengths and number of images, determines a length which causes no problem even though images are discarded as one image set when jam has occurred, and sets the length as the maximum permissible value.

Subsequently, the control unit 310 determines whether the common blank formation period calculated in step S202 is equal to or less than the maximum permissible value set in step S203 (step S204).

When the common blank formation period is equal to or less than the maximum permissible value (step S204: YES), the control unit 310 determines that it is not necessary to adjust the length of blanks between images in each job and proceeds to the process of step S209.

When the common blank formation period is not equal to or less than the maximum permissible value (step S204: NO), the control unit 310 performs the blank adjustment process for adjusting the length of blanks between images in each job in order to allow the common blank formation period to be equal to or less than the maximum permissible value (step S205). For example, when the lengths of images of jobs JA, JB, and JC are respectively '19', '40', and '19', the value of the common blank formation period calculated in step S202 is "760" which is the least common multiple of the lengths of the images. At this time, for example, when the maximum permissible value designated from a user in step S203 is '45' the control unit 310 adjusts the length of the blanks between the images in each job such that the common blank formation period is equal to or less than the maximum permissible value. Details of the blank adjustment process will be described later.

Subsequently, the control unit 310 allows a layout configuration of a print image of each job subjected to the blank adjustment process, the value of the length of the blanks and the like to be displayed on the operating display unit 340, and receives an instruction from a user about whether to print the jobs with by layout configuration (step S206).

When a print instruction has been received (step S206: YES), the control unit 310 proceeds to the process of step S209.

When a non-print instruction has been received (step S206: NO), the control unit 310 replaces the jobs included in the job set with other jobs and receives an instruction from a user about whether to perform the blank adjustment process again (step S207). In detail, the control unit 310 allows candidates of jobs to be replaced to be displayed on the operating display unit 340, and receives an instruction from a user about whether to perform job replacement.

When a non-job replacement instruction has been received (step S207: NO), the control unit 310 proceeds to the process of step S209.

When a job replacement instruction has been received (step S207: YES), the control unit 310 replaces the jobs included in the job set with jobs registered in the job list (step S208). Details of the job replacement process will be described later. The control unit 310 returns to the process of step S205 and performs the blank adjustment process with respect to the job set in which the jobs have been replaced. The control unit 310 repeats the processes of steps S205 to S208 until the print instruction is received in step S206 or the non-job replacement instruction is received in step S207.

Subsequently, the control unit 310 serves as an identification mark forming unit and generates a job for printing an identification mark for identifying each common blank in the vicinity of the common blank of the continuous paper S (step S209). Details of a process for printing the identification mark will be described later.

Subsequently, the control unit 310 sets information for arranging and printing a plurality of jobs, in which images are repeatedly arranged in the conveyance direction and are printed, in the width direction of the continuous paper S (step S210). In detail, based on information on each job of the job set acquired in step S201, the length of the blanks between images of each job adjusted in step S205, and the like, the control unit 310 sets various types of information for printing a plurality of image sequences on the continuous paper S as illustrated in FIG. 5.

Subsequently, based on the information set in step S210, the control unit 310 prints the images on the continuous paper S (step S211).

Subsequently, the control unit 310 determines whether abnormality such as jam has occurred in the continuous paper S during printing (step S212). In detail, based on information on a paper sensor provided on the conveyance path of the continuous paper S and the like, the control unit 310 determines whether the abnormality such as jam has occurred.

When the abnormality such as jam has occurred (step S212: YES), the control unit 310 temporarily stops the printing, and performs a post-jam printing process for performing printing inclusive of images broken by the jam after the jam is solved (step S213). Details of the post-jam printing process will be described later. The control unit 310 returns to the process of step S210 and performs a process with respect to jobs regenerated by the post-jam printing process of step S213.

When the abnormality such as jam has not occurred (step S212: NO), the control unit 310 completes the printing process.

<Calculation Process of Common Blank Formation Period of Step S202>

Figure 10A:
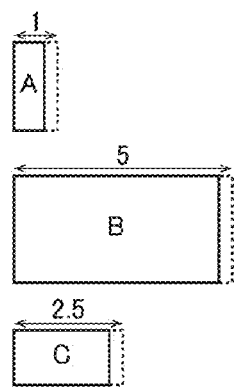
FIGS. 10A, 10B and 10C are diagrams illustrating an aspect in which a calculation process of a common blank forming period indicated in step S202 of FIG. 9 is performed.
Figure 10B:
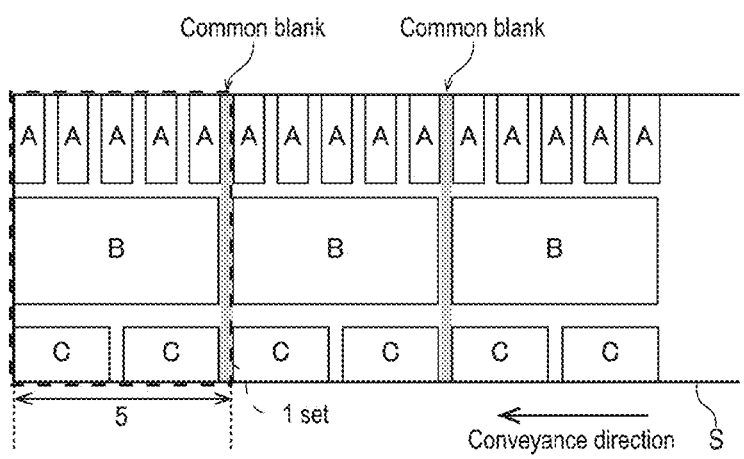
Figure 10C:
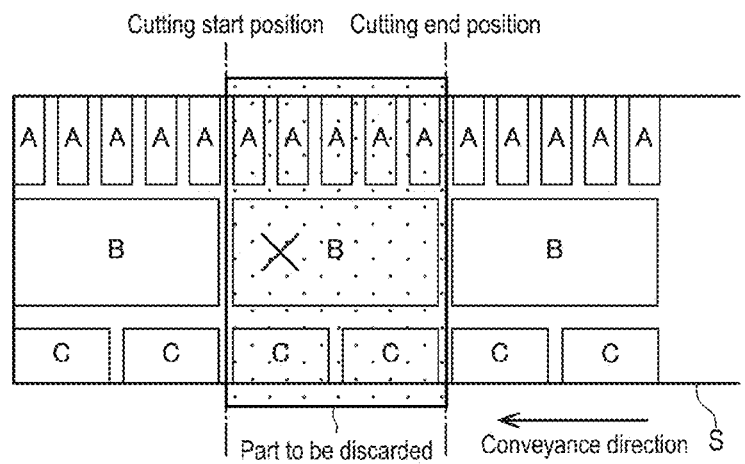

FIGS. 10A, 10B and 10C are diagrams illustrating an aspect in which the calculation process of the common blank forming period indicated in step S202 of FIG. 9 is performed. FIG. 10A illustrates images A, B, and C included in jobs JA, JB, and JC and respectively arranged and printed in the conveyance direction. FIG. 10B illustrates an aspect in which each job has been printed on the continuous paper S. FIG. 10C illustrates an aspect in which jam occurs at a position 'X' during printing and a part of the continuous paper S is cut and discarded.

As illustrated in FIG. 10A, the lengths of the images A, B, and C in the conveyance direction are '1', '5', and '2.5', respectively. These lengths include the lengths of blanks among images set in advance at the time of job generation. When the jobs JA, JB, and JC are printed, common blanks are formed on the continuous paper S as illustrated in FIG. 10B. Herein, in the conveyance direction of the continuous paper S, a period (an interval) in which the common blanks are formed is '5' which is the least common multiple of the respective lengths of the images A, B, and C. The control unit 310 calculates the value of the least common multiple of the lengths of the images of the jobs as the common blank forming period. As described above, the common blank forming period is calculated, so that a user can catch the period at which the common blanks are formed and deal with a plurality of images interposed between the common blanks as one image set. In this way, for example, as illustrated in FIG. 10C, when jam has occurred during printing, a user can cut common blank parts and discard an image set including "X", thereby cutting the continuous paper S without cutting any images. As a consequence, it is not necessary to count the number of cut images and set a print job again, so that it is easy to perform work after jam occurs.

<Blank Adjustment Process of Step S205>

Figure 11A:
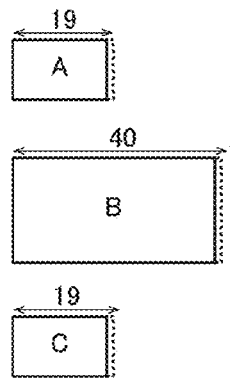
FIGS. 11A, 11B and 11C are diagrams illustrating an aspect in which a blank adjustment process indicated in step S205 of FIG. 9 is performed.
Figure 11B:
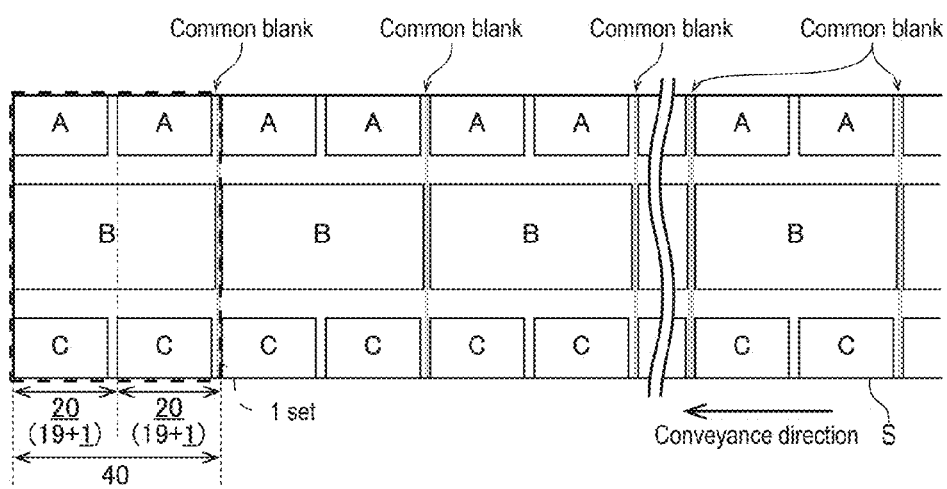
Figure 11C:
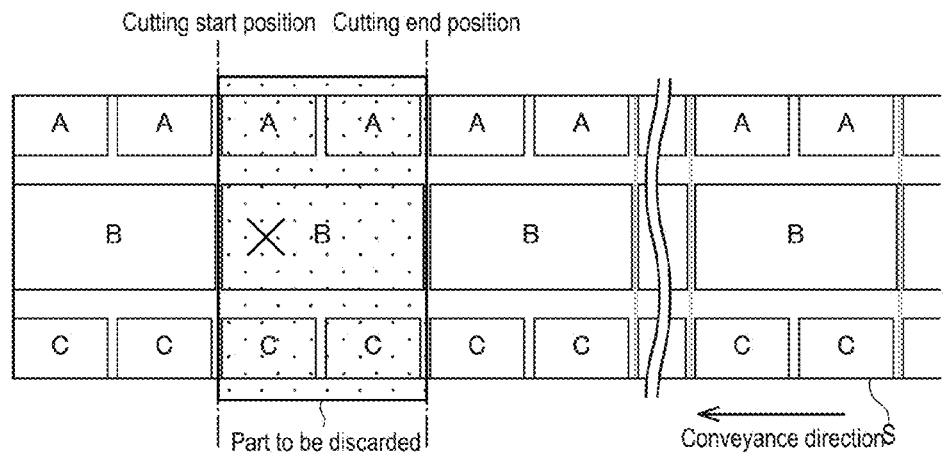
Figure 12A:
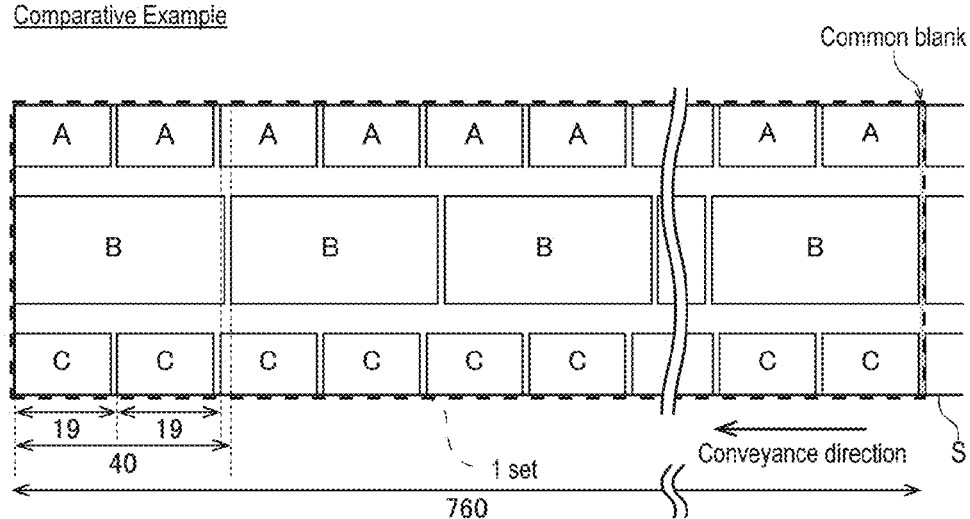
FIGS. 12A and 12B are diagrams illustrating a continuous paper subjected to a printing process in an image forming system according to a comparison example.
Figure 12B:
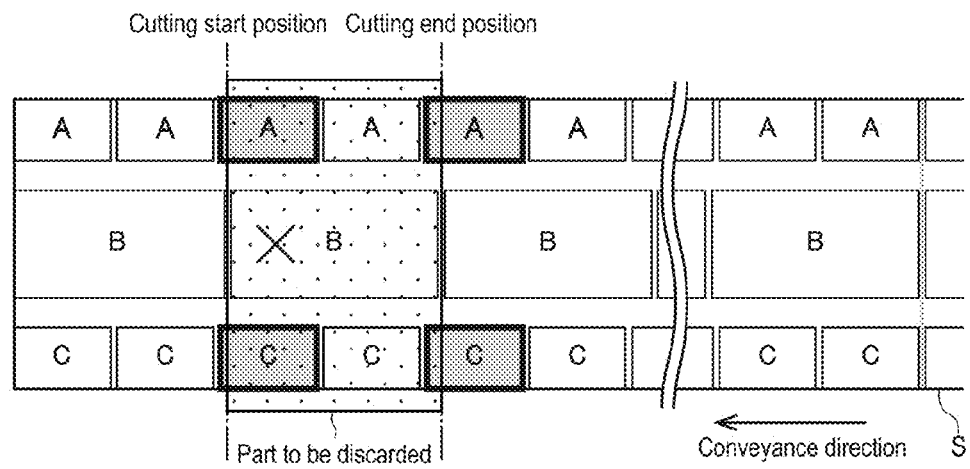

FIGS. 11A, 11B and 11C are diagrams illustrating an aspect in which the blank adjustment indicated in step S205 of FIG. 9 is performed. FIGS. 12A and 12B are diagrams illustrating a continuous paper subjected to a printing process in an image forming system according to a comparison example. FIG. 11A illustrates images A, B, and C included in jobs JA, JB, and JC and respectively arranged and printed in the conveyance direction. FIG. 11B illustrates an aspect in which the blank adjustment process is performed for each job and then each job is printed on the continuous paper S. FIG. 11C illustrates an aspect in which jam occurs at a position 'X' during printing and a part of the continuous paper S is cut and discarded. Furthermore, FIG. 12A illustrates an aspect in which the images A, B, and C are printed on the continuous paper S in the state in which the blank adjustment process has not been performed. FIG. 12B illustrates an aspect in which jam occurs at a position 'X' during printing and a part of the continuous paper S is cut and discarded.

As illustrated in FIG. 11A, the lengths of the images A, B, and C in the conveyance direction are '19', '40', and '19', respectively. These lengths include the lengths of blanks among images set in advance at the time of job generation. The maximum permissible value designated from a user is assumed to be '45'. In this case, as illustrated in FIG. 11B, the control unit 310 performs the blank adjustment process of adding a blank having a length of '1' to the image A and the image C, and sets the lengths of the image A and the image C including the blanks in the conveyance direction to "20". A calculation method of the blank adjustment process will be described later.

By the aforementioned blank adjustment process, the common blank forming period becomes '40' which is the least common multiple of the respective lengths '20', '40', and '20' of the images A, B, and C after the blank adjustment process. Accordingly, the common blank forming period becomes smaller than the maximum permissible value '45' set by the user. In this case, as illustrated in FIG. 11C, when jam has occurred, the user can cut common blank parts and discard an image set including "X", thereby cutting the continuous paper S without cutting any images. Consequently, it is possible to efficiently and easily perform job treatment.

Meanwhile, when printing is performed for the jobs JA, JB, and JC including the images A, B, and C illustrated in FIG. 11A without performing the blank adjustment process, the common blank forming period becomes '760' as illustrated in FIG. 12A. In this state, the case in which jam has occurred at the position 'X' as illustrated in FIG. 12B is considered. In this case, for example, in order to discard the image B including 'X' which is the jam occurrence place, a user cuts blank parts at both ends of the image B in the width direction of the continuous paper S. As a consequence, two images A and two images C indicated by thick frames in FIG. 12B are cut. A user needs to confirm cut images included in remaining parts in addition to the cut and discarded parts and perform cutting and discard. Furthermore, for example, when an end portion of the image A or the image C, that is, a boundary part between the image and the blank has been cut, a user needs to confirm whether images have been cut and then perform determination. Furthermore, in order to cut the continuous paper S without cutting any images, since it is necessary to discard the image set having the length of '760', the paper becomes wasteful.

Figure 13:
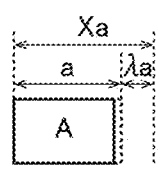
FIG. 13 is a diagram for explaining a calculation method of a blank adjustment process.
Figure 13:
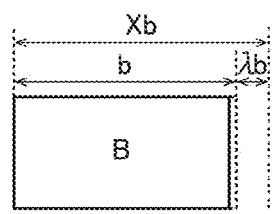
Figure 13:
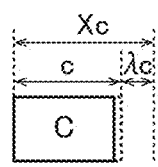

FIG. 13 is a diagram for explaining the calculation method of the blank adjustment process.

The following description will be provided for the case in which the blank adjustment process is performed for the images A, B, and C included in the jobs JA, JB, and JC as illustrated in FIG. 13.

The lengths of the images A, B, and C in the conveyance direction are assumed to be a, b, and c (constants), respectively. These lengths a, b, and c include blank parts (dotted parts) set in each image in advance.

It is assumed that blank adjustment amounts, which are change amounts of the lengths when the blank adjustment process is performed for the images A, B, and C, are $\lambda_a$, $\lambda_b$, and $\lambda_c$ (variables), respectively.

It is assumed that the lengths of the images A, B, and C in the conveyance direction after the blank adjustment process is performed are $X_a$, $X_b$, and $X_c$ (variables), respectively. The lengths $X_a$, $X_b$, and $X_c$ after the blank adjustment respectively satisfy conditions expressed by the following Equations.

$$X_a = a + \lambda_a (X_a \geq a, \lambda_a \geq 0) \quad \text{Equation 1}$$

$$X_b = b + \lambda_b (X_b \geq b, \lambda_b \geq 0) \quad \text{Equation 2}$$

$$X_c = c + \lambda_c (X_c \geq c, \lambda_c \geq 0) \quad \text{Equation 3}$$

Subsequently, it is assumed that the maximum permissible value designated by a user in step S203 is Z (a constant) and the number of the images A, B, and C included in one image set is $Y_a$, $Y_b$, and $Y_c$. The numbers $Y_a$, $Y_b$, and $Y_c$ are respectively calculated as constants by the following Equations.

$Z/a = Y_a$ ... remainder ($Y_a$ is an integer equal to or more than 1)

$Z/b = Y_b$ ... remainder ($Y_b$ is an integer equal to or more than 1)

$Z/c = Y_c$ ... remainder ($Y_c$ is an integer equal to or more than 1)

Herein, in the images A, B, and C, their rear end portions coincide with one another in the conveyance direction for each one image set, so that common blanks are formed. That is, the length when the image A having the length $X_a$ after the blank adjustment process has been arranged by $Y_a$ is equal to the length when the image B having the length $X_b$ after the blank adjustment process has been arranged by $Y_b$, and is also equal to the length when the image C having the length $X_c$ after the blank adjustment process has been arranged by $Y_c$. Accordingly, in relation to the numbers $Y_a$, $Y_b$, and $Y_c$ of the images A, B, and C and the lengths $X_a$, $X_b$, and $X_c$ of the images A, B, and C after the blank adjustment, relations indicated by the following Equations are established.

$$Y_a \times X_a = Y_b \times X_b$$

$$Y_a \times X_a = Y_c \times X_c$$

When the aforementioned two Equations are respectively deployed for $X_b$ and $X_c$, the following Equations are obtained.

$$X_b = Y_a \times X_a / Y_b \quad \text{Equation 4}$$

$$X_c = Y_a \times X_a / Y_c \quad \text{Equation 5}$$

Furthermore, the length when the image A having the length $X_a$ after the blank adjustment process has been arranged by $Y_a$ is equal to or less than the maximum permissible value Z and is equal to or more than the length when the image A having the length a before the blank adjustment has been arranged by $Y_a$. Accordingly, a relation indicated by the following Equation is established.

$$Z \geq Y_a \times X_a \geq Y_a \times a$$

When each side of the aforementioned Equation is divided by $Y_a$ and is deployed as Equation indicating a range condition of $X_a$, the following Equation is obtained.

$$Z/Y_a \geq X_a \geq a \qquad \text{Equation 6}$$

In the aforementioned Equation 6, Z, $Y_a$, and a are respectively constants. Accordingly, the range of $X_a$ is indicated by a constant.

Furthermore, similarly to $X_a$, the following Equations are also obtained for $X_b$ and $X_c$.

$$Z/Y_b \geq X_b \geq b$$

$$Z/Y_c \geq X_c \geq c$$

Herein, when Equations 4 and 5 are put into the aforementioned two Equations and the two Equations are deployed as Equations indicating the range condition of $X_a$, the following Equations are obtained.

$$Z/Y_a \geq X_a \geq b \times X_b/Y_a \qquad \text{Equation 7}$$

$$Z/Y_a \geq X_a \geq c \times X_c/Y_a \qquad \text{Equation 8}$$

By Equations 6 to 8, the range condition of $X_a$ is determined.

Among the values of the right sides of Equations 6 to 8, a maximum value is a minimum value which can be taken by $X_a$. In the present embodiment, since it is desired that the common blank forming period is short, it is also desired that the value of $X_a$ is also small. Accordingly, the value of $X_a$ is determined as the aforementioned minimum value. By a method similar to that of $X_a$, $X_b$ and $X_c$ are also determined. When $X_a$, $X_b$, and $X_c$ are determined, the blank adjustment amounts $\lambda_a$, $\lambda_b$, and $\lambda_c$, which are length change amounts when the blank adjustment process is performed, are also determined by Equations 1 to 3.

The control unit 310 can change the lengths of the blanks among the images of each job by using the blank adjustment amounts $\lambda_a$, $\lambda_b$, and $\lambda_c$ determined as described above, thereby performing the blank adjustment process.

<Application Example of Blank Adjustment Process>

An example of the aforementioned blank adjustment process will be described by applying the example illustrated in FIGS. 11A, 11B and 11C.

For example, when the images illustrated in FIG. 11A are applied to the aforementioned Equations, a is '19', b is '40', and c is '19' from the lengths of the images A, B, and C. Furthermore, the maximum permissible value set by a user is '45' and Z is '45'.

The number $Y_a$ of images A is '2', which is a quotient of Z/a, the number $Y_b$ of images B is '1', which is a quotient of Z/b, and the number $Y_c$ of images C is '2', which is a quotient of Z/c.

When these values are put into the aforementioned Equations 6 to 8, the aforementioned Equations 6 to 8 are as follows.

$$22.5 \geq X_a \geq 19 \qquad \text{Equation 6}$$

$$22.5 \geq X_a \geq 20 \qquad \text{Equation 7}$$

$$22.5 \geq X_a \geq 19 \qquad \text{Equation 8}$$

Among the values of the right sides of the Equations 6 to 8, a maximum value is '20' of Equation 7. Accordingly, since a minimum value which can be taken by $X_a$ is '20', the value of $X_a$ is determined to '20'. By a method similar to that of $X_a$, the value of $X_b$ is determined to '40' and the value of $X_c$ is determined to '20'. Furthermore, by the Equations 1 to 3, $\lambda_a$ is '2', $\lambda_b$ is '0', and $\lambda_c$ is '1'. Accordingly, as illustrated in FIG. 11B, the control unit 310 performs the blank adjustment process of adding a blank having a length of '1' to the image A and the image C, thereby allowing the lengths of the image A and the image C including the blanks in the conveyance direction to be '20'.

<Job Replacement Process of Step S208>

Figure 14A:
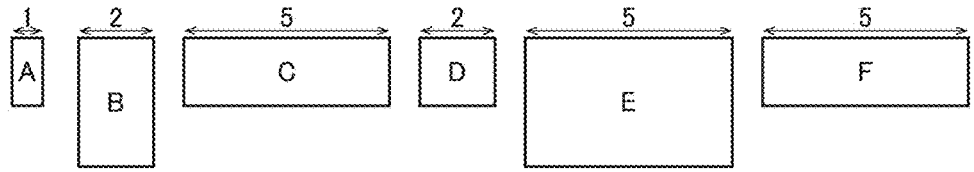
FIGS. 14A, 14B and 14C are diagrams for explaining a job replacement process indicated in step S208 of FIG. 9.
Figure 14B:
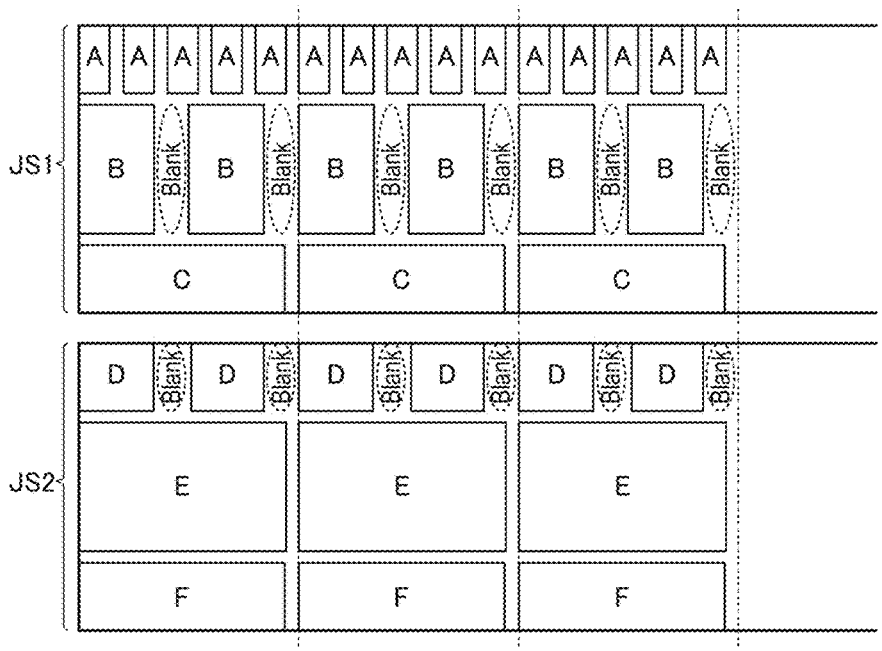
Figure 14C:
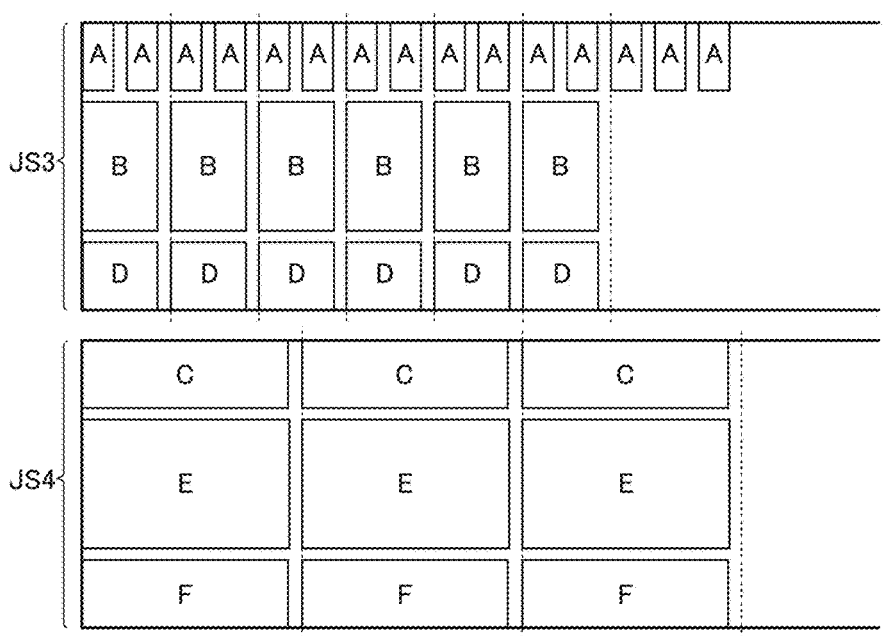

FIGS. 14A, 14B and 14C are diagrams for explaining the job replacement process indicated in step S208 of FIG. 9. FIG. 14A illustrates images A to F included in jobs JA to JF and respectively arranged and printed in the conveyance direction. FIG. 14B illustrates an aspect in which the blank adjustment process has been performed after the images A to F are arranged in the width direction of the continuous paper S in an order in which each job has been acquired. FIG. 14C illustrates an aspect in which each job has been arranged in the width direction of the continuous paper S after the job replacement process is performed.

As illustrated in FIG. 14A, the lengths of the images A to F in the conveyance direction are '1', '2', '5', '2', '5', and '5', respectively.

The control unit 310 arranges each job on the continuous paper S in an order (an alphabetical order) in which the jobs JA to JF have been acquired. For example, as illustrated in FIG. 14B, one job set JS1 is formed by the jobs JA to JC and the other job set JS2 is formed by the jobs JD to JF.

In the job set JS1, the lengths of the images A to C in the conveyance direction are '1', '2', and '5' respectively. Accordingly, the value of a common blank forming period in the job set JS1 is '10' which is the least common multiple of the lengths of the images. Furthermore, in the job set JS2, the lengths of the images D to F in the conveyance direction are '2', '5', and '5', respectively. Accordingly, the value of a common blank forming period in the job set JS2 is '10' which is the least common multiple of the lengths of the images. Herein, in the example of FIG. 14B, a maximum permissible value has been set to '5'. Accordingly, the blank adjustment process is performed such that the common blank forming period is equal to or less than the maximum permissible value. As described above, when the value of the least common multiple of the lengths of the images is larger than the maximum permissible value, blanks among the images easily occur as illustrated in FIG. 14B. In this regard, the control unit 310 performs job replacement between the job sets, thereby allowing the blanks among the images to be small. Hereinafter, a process of replacing a job will be described in detail.

Firstly, based on the length of the continuous paper S in the width direction (the main scanning direction) and the lengths of each image in the width direction (the main scanning direction), the control unit 310 excludes a job, for which job replacement is not possible, from job replacement targets. In the example of FIG. 14B, since it is not possible to replace the jobs JB and JE including the images B and E having long lengths in the width direction with other jobs, they are excluded from targets of the job replacement process. Accordingly, the control unit 310 fixes the jobs JB and JE to the jobs JS1 and JS2, respectively, and performs a process.

Subsequently, the control unit 310 calculates the least common multiples of the lengths of each image in the conveyance direction with respect to all patterns for replacing the jobs JA and JC of the job set JS1 and the jobs JD and JF of the job set JS2. The control unit 310 selects a pattern in which the calculated least common multiples of the lengths of each image are minimum. In the present example, as illustrated in FIG. 14C, when the job JC and the job JD have been replaced, the least common multiples of the lengths of each image are minimum. In detail, the least common multiple of the lengths of each image in the job set JS3 including the jobs JA, JB, and JD is '2'. Furthermore, the least common multiple of the lengths of each image in the job set JS4 including the jobs JC, JE, and JF is '5'. As described above, as compared with the job sets JS1 and JS2 before the job replacement, the values of the least common multiples of the lengths of each image are small in the job sets JS3 and JS4 after the job replacement. Accordingly, the control unit 310 can perform replacement of the job JC and the job JD, thereby allowing the blanks among the images to be small as illustrated in FIG. 14C.

<Identification Mark Generation Process of Step S209>

Figure 15:
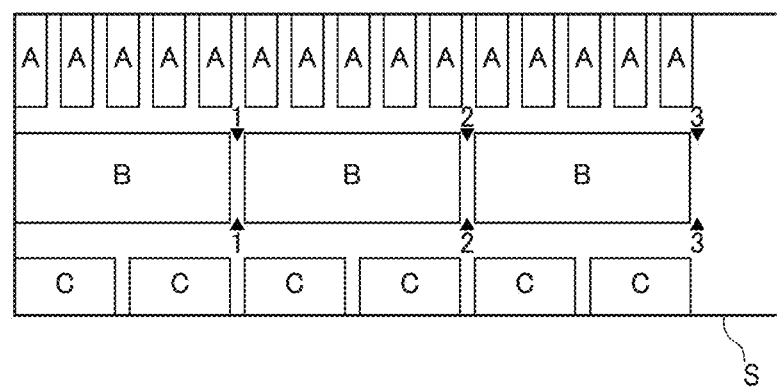
FIG. 15 is a diagram for explaining a job generation process for printing an identification mark indicated in step S209 of FIG. 9.
Figure 16:
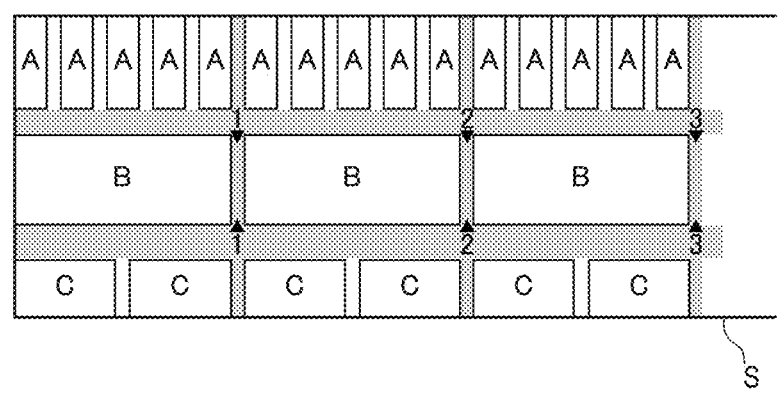
FIG. 16 is a diagram illustrating an example of an area where an identification mark is formed.

FIG. 15 is a diagram for explaining a job generation process for printing the identification mark indicated in step S209 of FIG. 9. FIG. 16 is a diagram illustrating an example of an area where the identification mark is formed.

The identification mark includes common blank counter values which are numbers assigned to a plurality of common blanks in order to identify the common blanks from one another. The common blank counter values, for example, are numbers increasing from 1 one by one in an order, in which the common blank is formed, as illustrated in FIG. 15. The common blank counter values serve as identification mark information representing each identification mark.

As illustrated as a shaded area in FIG. 16, the identification mark may also be formed at a common blank part extending in the width direction of the continuous paper S, or may also be formed at common blanks among image sequences of each job in the conveyance direction of the continuous paper S.

<Job Recovery Process Step S213>

Figure 17:
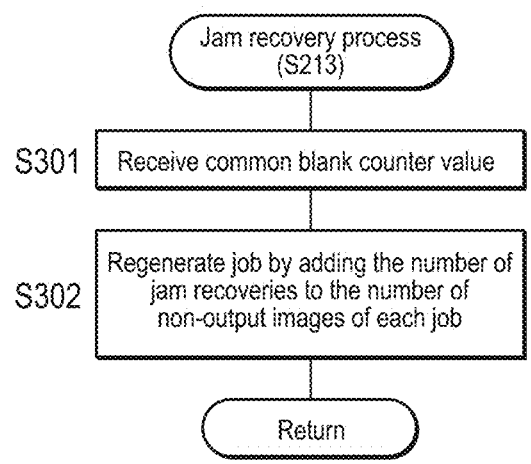
FIG. 17 is a flowchart illustrating the procedure of a jam recovery process indicated in step S213 of FIG. 9.

FIG. 17 is a flowchart illustrating the procedure of the jam recovery process indicated in step S213 of FIG. 9. An algorithm illustrated in the flowchart of FIG. 17, for example, has been stored in the HDD 360 of the image forming apparatus 300 as a program, and is executed by the control unit 310.

Before the process illustrated in FIG. 17 is performed, jam has occurred in the continuous paper S and the jam occurrence place has been cut and discarded. For example, when jam has occurred between the common blank counter values '1' and '3' illustrated in FIG. 15, the continuous paper S is cut along common blanks corresponding to the common blank counter values '1' and '3' and an image set between the common blank counter values '1' and '3' is discarded. An example of the jam recovery process in this case will be described below.

As illustrated in FIG. 17, the control unit 310 serves as an identification mark information reception unit and receives the input of the common blank counter values (step S301). In detail, the control unit 310 receives the input of the common blank counter values corresponding to the common blanks cut for jam treatment. The common blank positioned at a downstream side of the conveyance direction corresponds to a cutting start position, and the common blank positioned at an upstream side corresponds to a cutting end position. In the present example, the control unit 310 receives the input of the common blank counter value '1' indicating the common blank of the cutting start position and the common blank counter value '3' indicating the common blank of the cutting end position.

Subsequently, the control unit 310 adds the number of images discarded by the jam treatment to the number of images having not been output in each job, thereby regenerating a job (step S302). In detail, based on the common blank counter values indicating the cutting start position and the cutting end position received in the process of step S301, the control unit 310 counts the number of images discarded by the jam treatment. For example, the control unit 310 can determine that the number of discarded image sets is '2' from the difference between the common blank counter value '1' of the cutting start position and the common blank counter value '3' of the cutting end position. Accordingly, the control unit 310 can determine that the images A to C corresponding the two image sets, that is, 10 images A, 2 images B, and 4 images C have been discarded. The control unit 310 adds the number of discarded images to the number of images having not been output in each job, thereby regenerating a job. The number of images having not been output in each job is employed as the number of images arranged at the upstream side of the conveyance direction from the cutting end position, and a job may also be regenerated. Alternatively, a number, which is obtained by subtracting the number of images having been already output from the number of images arranged at the upstream side of the conveyance direction from the cutting end position, is employed, so that a job may also be regenerated.

As described above, according to the image forming system 10 of the present embodiment, when a plurality of jobs for printing images repeatedly arranged in the conveyance direction of the continuous paper S are arranged in the width direction of the continuous paper S and are printed, a formation period of a common blank, in which blanks between the images coincide with each other between the jobs, is set. In this way, for example, at the time of occurrence of jam, the continuous paper S is cut along the common blank, so that it is possible to cut the continuous paper S without cutting images. Furthermore, it is possible to set the common blank forming period, so that it is possible to suppress the length of the continuous paper S to be cut and discarded and thus to reduce the wastefulness of the paper.

Furthermore, the image forming system 10 changes the length of a blank between images of at least one of a plurality of jobs and sets the common blank forming period such that the common blank forming period does not exceed the maximum permissible value. In this way, it is possible to form a common blank at a desired period regardless of a period at which a blank between images of each job appears. Consequently, it is possible to adjust the common blank forming period more flexibly and to efficiently cut the continuous paper S at the time of occurrence of jam and the like.

Furthermore, the image forming system 10 selects jobs, which are combined as job sets arranged in the width direction of the continuous paper S for image formation, regardless of an acquisition order of the jobs such that the common blank forming period is within a desired range. In this way, it is possible to configure a job set in which a blank between images is small in the range in which the common blank forming period is within the desired range, so that it is possible to further reduce the wastefulness of the paper.

Furthermore, the image forming system 10 forms the identification mark for identifying common blanks in the vicinity of the common blanks. In this way, it is possible to easily catch the positions of the common blanks, so that it is easy to perform work for cutting the continuous paper S at the time of occurrence of jam and the like.

Furthermore, the image forming system 10 receives the input of the identification mark information representing the identification mark, and designates a position, at which image formation restarts after jam occurs in the continuous papers, based on the received identification mark information. In this way, printed identification mark information is just input, so that it is possible to simply and reliably restart an image forming process after jam treatment.

Furthermore, based on the identification mark information, the image forming system 10 calculates the number of remaining images which include images broken by the jam in each job and is not completely subjected to image formation, and regenerates a job for forming the remaining images. In this way, since a user does not manually count the number of remaining images and the number of discarded images or set a job, it is possible to simply and reliably restart an image forming process after jam treatment.

In addition, in the aforementioned embodiment, the example in which the control unit 310 is provided in the image forming apparatus 300 has been described; however, the present invention is not limited thereto. The control unit 310 may also be provided in other apparatuses of the image forming system 10. Alternatively, the control unit 310 may also be provided in the terminal apparatus 900 connected to the image forming system 10, or may also be provided in a server, a controller and the like connected to the image forming system 10 via a network.

Furthermore, in the aforementioned embodiment, the example in which various operations of a user such as the job reservation registration and the common blank forming period setting are performed by operating the operating display unit 340 has been described; however, the present invention is not limited thereto. The various operations of the user may also be performed by another apparatuses such as the terminal apparatus 900.

Furthermore, in the aforementioned embodiment, the case in which a blank is originally provided between images before the blank adjustment process is performed has been described; however, the present invention is not limited thereto. Before the blank adjustment process is performed, the images may be arranged with no gap without providing the blank between the images. Furthermore, the images may be arranged with no gap, but a blank may also be provided in the image.

Furthermore, in the aforementioned embodiment, the example in which the blank adjustment process is performed for a job set including three jobs has been described; however, the number of jobs to be subjected to the blank adjustment process is not limited thereto. Even when the number of jobs has increased, it is possible to finally decide the range of a blank by comparison of a minimum value condition of a linear expression and to uniquely decide a blank adjustment amount, so that it is possible to perform the blank adjustment process.

Furthermore, in the aforementioned embodiment, the example in which the least common multiples of the lengths of each image in the conveyance direction are compared with each other in the job replacement process has been described; however, the present invention is not limited thereto. In the job replacement process, for example, in all patterns in which jobs are replaced, the blank adjustment process may also be performed to calculate a blank area and a pattern, in which the blank area becomes minimum, may also be selected. Furthermore, in consideration of other conditions such as job execution priority in addition to the blank area, the job replacement process may also be performed.

Furthermore, in the aforementioned embodiment, the example in which a job for printing the identification mark is newly generated has been described; however, the present invention is not limited thereto. The identification mark may also be printed by changing an existing job included in a job set.

Furthermore, in the aforementioned embodiment, the example in which the identification mark is printed in correspondence to the common blank has been described; however, the present invention is not limited thereto. The identification mark may also be printed in correspondence to each image set partitioned by the common blank. In this case, a user can designate identification marks corresponding to image sets, thereby designating a print restart position after jam occurs.

Furthermore, in the aforementioned embodiment, the example in which the cutting start position and the cutting end position are designated by the input of the common blank counter value has been described; however, the present invention is not limited thereto. For example, the print restart position after jam treatment may also be designated by the input of the common blank counter value. In this case, in re-printing after the jam treatment, images of an upstream side from a common blank corresponding to the input common blank counter value are printed.

A means and a method for performing various processes in the image forming system according to the aforementioned embodiment can also be realized by any one of a dedicated hardware circuit or a programmed computer. The aforementioned program, for example, may also be provided by a computer-readable recording medium such as a flexible disk and CD-ROM, or may also be provided on-line via a network such as the Internet. In this case, the program recorded on the computer-readable recording medium is typically transmitted to and stored in a storage unit such as a hard disk. Furthermore, the aforementioned program may also be provided as single application software, or may also be incorporated in software of the image forming system as one function of the image forming system.

What is claimed is:

1. An image forming apparatus comprising:
  a processor configured to:
    acquire a plurality of jobs for arranging images having widths smaller than a width of a continuous paper in a conveyance direction of the continuous paper, and
    arrange the jobs acquired by the processor in a width direction of the continuous paper; and
  an image forming unit which forms images based on the information set by the control unit,
  wherein the processor is configured to set a common blank forming interval at which blanks among images within respective jobs coincide with blanks among images within parallel jobs in the conveyance direction and repeatedly form a common blank within the parallel jobs based on the common blank forming interval.

2. The image forming apparatus as claimed in claim 1, wherein the processor is configured to:
  receive setting of a maximum permissible value of the common blank forming interval, and
  change a length of a blank between images of at least one of the plurality of jobs and the common blank forming interval such that the common blank forming interval does not exceed the maximum permissible value.

3. The image forming apparatus as claimed in claim 1, wherein the processor is configured to select jobs, which are arranged in the width direction and are combined for image formation, regardless of an acquisition order of the jobs such that the common blank forming interval is within a desired range.

4. The image forming apparatus as claimed in claim 1, wherein the processor is configured to:
form an identification mark in vicinity of the common blank.

5. The image forming apparatus as claimed in claim 4, wherein the processor is configured to:
receive input of identification mark information representing the identification mark, and
designate a position, at which image formation is restarted after jam occurs in the continuous paper, based on the identification mark information received by the processor.

6. The image forming apparatus as claimed in claim 5, wherein the processor is configured to calculate a number of remaining images which include images broken by the jam in each job and is not completely subjected to image formation based on the identification mark information, and regenerates a job for forming the remaining images.

7. The image forming apparatus as claimed in claim 1, wherein the plurality of jobs are for repeatedly arranging images.

8. An image forming method comprising the steps of:
(a) acquiring a plurality of jobs for arranging images having widths smaller than a width of a continuous paper in a conveyance direction of the continuous paper;
(b) setting information for arranging the jobs acquired in the acquisition step in a width direction of the continuous paper; and
(c) forming images based on the information set in the step (b),
wherein the step (b) comprises the step of setting a common blank forming interval at which blanks among images within respective jobs coincide with blanks among images within parallel jobs in the conveyance direction and repeatedly forming a common blank within the parallel jobs based upon the common blank forming interval.

9. The image forming method as claimed in claim 8, further comprising the step of:
(d) receiving setting of a maximum permissible value of the common blank forming interval,
wherein the step (b) comprises the step of changing a length of a blank between images of at least one of the plurality of jobs and setting the common blank forming interval such that the common blank forming interval does not exceed the maximum permissible value.

10. The image forming method as claimed in claim 8, wherein the step (b) comprises the step of selecting jobs, which are arranged in the width direction and are combined for image formation, regardless of an acquisition order of the jobs such that the common blank forming interval is within a desired range.

11. The image forming method as claimed in claim 8, further comprising the step of:
(e) forming an identification mark in vicinity of the common blank.

12. The image forming method as claimed in claim 11, further comprising the step of:
(f) receiving input of identification mark information representing the identification mark,
wherein the step (b) comprises the step of designating a position, at which image formation is restarted after jam occurs in the continuous paper, based on the identification mark information received.

13. The image forming method as claimed in claim 12, wherein the step (b) comprises the step of calculating a number of remaining images which include images broken by the jam in each job and is not completely subjected to image formation based on the identification mark information, and regenerating a job for forming the remaining images.

14. A non-transitory computer-readable recording medium stored with a common blank forming interval setting program causing a computer to execute a process for forming images on a continuous paper, comprising the steps of:
(a) acquiring a plurality of jobs for arranging images having widths smaller than a width of a continuous paper in a conveyance direction of the continuous paper; and
(b) setting information for arranging the jobs acquired in the acquisition step in a width direction of the continuous paper,
wherein the step (b) comprises the step of setting a common blank forming interval at which blanks among images in respective jobs coincide with blanks among images within parallel jobs in the conveyance direction and repeatedly forming a common blank within the parallel jobs based on the common blank forming interval.

15. The recording medium as claimed in claim 14, further comprising:
(d) receiving setting of a maximum permissible value of the common blank forming interval,
wherein the control step (b) comprises the step of changing a length of a blank between images of at least one of the plurality of jobs and setting the common blank forming interval such that the common blank forming interval does not exceed the maximum permissible value.

16. The recording medium as claimed in claim 14, wherein the step (b) comprises the step of selecting jobs, which are arranged in the width direction and are combined for image formation, regardless of an acquisition order of the jobs such that the common blank forming interval is within a desired range.

17. The recording medium as claimed in claim 14, further comprising the step of:
(e) forming an identification mark in vicinity of the common blank.

18. The recording medium as claimed in claim 17, further comprising the step of:
(f) receiving input of identification mark information representing the identification mark,
wherein the step (b) comprises the step of designating a position, at which image formation is restarted after jam occurs in the continuous paper, based on the identification mark information received in the identification mark information reception step.

19. The recording medium as claimed in claim 18, wherein the step (b) comprises the steps of calculating a number of remaining images which include images broken by the jam in each job and is not completely subjected to image formation based on the identification mark information, and regenerating a job for forming the remaining images.

20. An image forming system having an image forming apparatus for forming images on a continuous paper, comprising:

a processor which acquires a plurality of jobs for arranging images having widths smaller than a width of a continuous paper in a conveyance direction of the continuous paper, and which sets information for arranging the jobs acquired by the processor in a width direction of the continuous paper, wherein the image forming apparatus comprises:

an image forming unit which forms images based on the information set by the control unit, and the processor sets a common blank forming interval at which blanks among images within respective jobs coincide with blanks among images within parallel jobs in the conveyance direction and repeatedly form a common blank within the parallel jobs based on the common blank forming interval.

* * * * *